US008850590B2

(12) United States Patent
Kellerman

(10) Patent No.: US 8,850,590 B2
(45) Date of Patent: Sep. 30, 2014

(54) SYSTEMS AND METHODS FOR USING TRANSPORT STREAM SPLICING FOR PROGRAMMING INFORMATION SECURITY

(75) Inventor: Marcus Kellerman, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1218 days.

(21) Appl. No.: 12/043,016

(22) Filed: Mar. 5, 2008

(65) Prior Publication Data

US 2009/0228709 A1 Sep. 10, 2009

(51) Int. Cl.
*H04L 29/06* (2006.01)
*H04L 9/32* (2006.01)

(52) U.S. Cl.
CPC ......... *H04L 9/3247* (2013.01); *H04L 2209/608* (2013.01)
USPC ............................................. 726/26; 380/260

(58) Field of Classification Search
CPC ........................ H04L 9/3247; H04L 2209/608
USPC ............................................. 726/26; 386/260
See application file for complete search history.

(56) References Cited

U.S. PATENT DOCUMENTS

| 5,621,793 | A | | 4/1997 | Bednarek et al. | |
|---|---|---|---|---|---|
| 5,982,436 | A | * | 11/1999 | Balakrishnan et al. | .. 375/240.05 |
| 6,430,301 | B1 | * | 8/2002 | Petrovic | ......................... 382/100 |
| 2002/0095582 | A1 | * | 7/2002 | Peled et al. | .................... 713/180 |
| 2002/0162118 | A1 | * | 10/2002 | Levy et al. | ..................... 725/110 |
| 2005/0254364 | A1 | * | 11/2005 | Kuroda | ......................... 369/47.1 |
| 2006/0110005 | A1 | * | 5/2006 | Tapson | .......................... 382/100 |
| 2007/0250901 | A1 | * | 10/2007 | McIntire et al. | .............. 725/146 |
| 2007/0291978 | A1 | * | 12/2007 | Kim et al. | ..................... 382/100 |
| 2009/0136081 | A1 | * | 5/2009 | Mamidwar et al. | ........... 382/100 |
| 2009/0150676 | A1 | * | 6/2009 | Chen et al. | ..................... 713/176 |

* cited by examiner

*Primary Examiner* — Joseph P. Hirl
*Assistant Examiner* — John B King
(74) *Attorney, Agent, or Firm* — Brinks Gilson & Lione

(57) ABSTRACT

Apparatus and methods for indicating the identity of a device for receiving and retransmitting programming information. The device, which may be a set-top box or suitable communication network receiver, may be configured to receive a broadcast signal from an antenna, which may be a satellite, a cable, an electronic communication network or any other suitable source. The programming information may be any type of audio or video data, or any other suitable type of data. The broadcast signal may have multiple channels that include the programming information. Each of the channels may include a distinct watermark. The device may splice between the channels to generate a signature that the device may embed in an output data stream that may be used to display or perform the programming information.

27 Claims, 13 Drawing Sheets

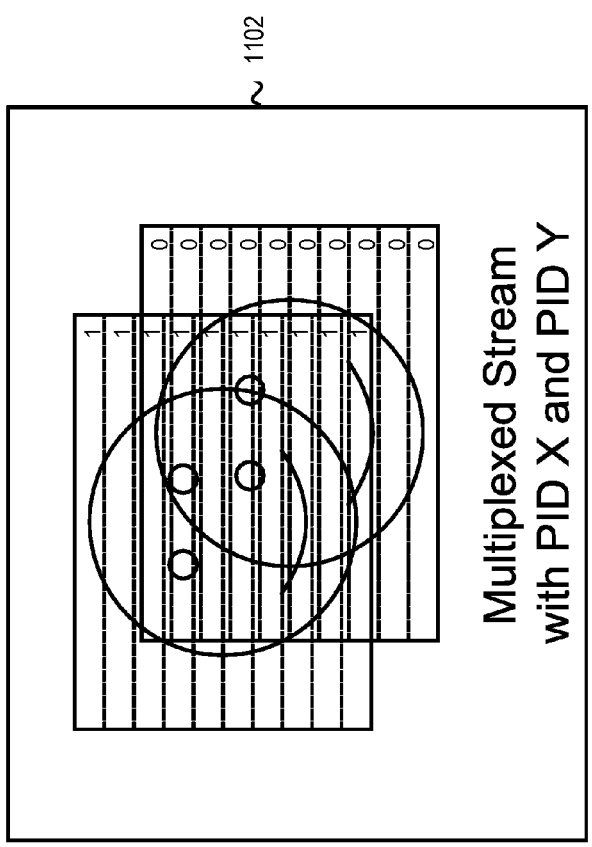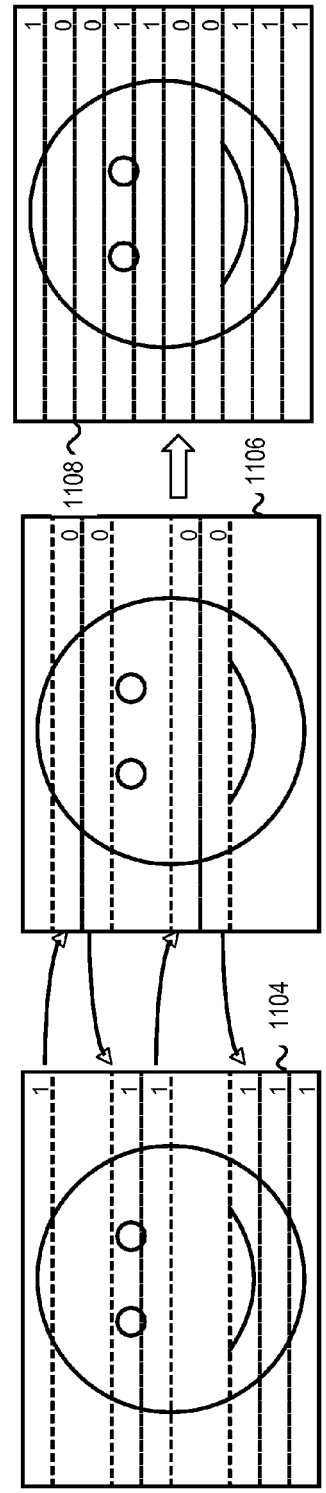
FIG. 11

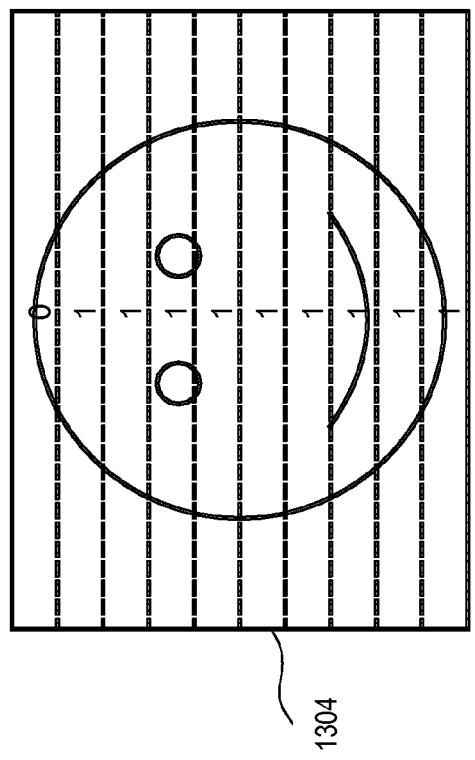
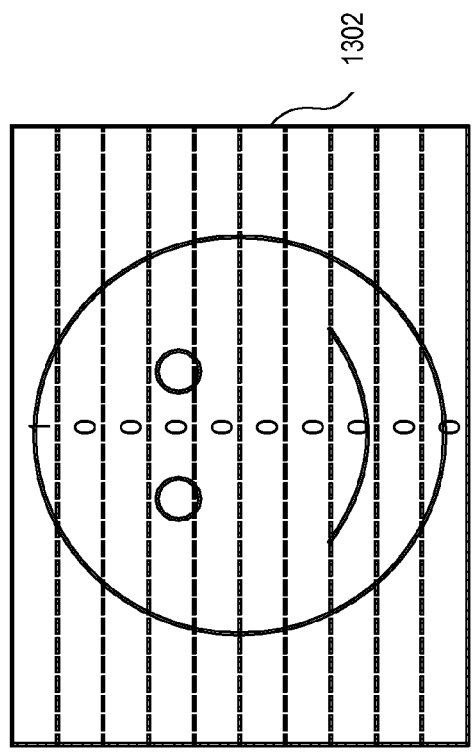
FIG. 13

SYSTEMS AND METHODS FOR USING TRANSPORT STREAM SPLICING FOR PROGRAMMING INFORMATION SECURITY

FIELD OF TECHNOLOGY

The present invention relates generally to programming information security.

BACKGROUND OF THE INVENTION

Content providers have been increasingly concerned regarding unauthorized retransmission and reproduction of their video content. In some instances, the content is pirated, posted on the Internet, or otherwise misappropriated. Some content providers have been evaluating methods of using set-top boxes to create video watermarks that uniquely identify the set-top box as a device through which content passed before the content was misappropriated.

Typically, creating a set-top-box-unique watermark requires access to decoded video stream. However, this poses several challenges. A first is that high video data commensurate with high-density ("HD") video programming consumes a massive amount of memory and is transmitted and processed at a high rate. Processing such data in real time using an embedded CPU on a set-top box consumes valuable processor cycles, and may interfere with content delivery to an output device, such as a television monitor. A second is that many content providers do not allow a set-top CPU to access video data in decrypted form (compressed or uncompressed).

Another method being analyzed by various companies is creating a watermark in the compressed video stream. This overcomes the CPU usage problems with the conventional watermark technique, but does not help prevent or deter unauthorized retransmission or reproduction.

It would be desirable, therefore, to provide apparatus and methods for deterring individuals from engaging in unauthorized retransmission or reproduction of video stream content.

SUMMARY OF THE INVENTION

A system and/or method for using transport stream splicing to support watermarking of programming information, substantially as shown in and/or described in connection with at least one of the figures, as set forth more completely in the claims.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which:

FIG. 11 shows an illustrative application of the method shown in FIG. 7;

FIG. 13 shows another aspect of the illustrative application of the method shown in FIG. 7.

DETAILED DESCRIPTION OF THE INVENTION

Figure 1:
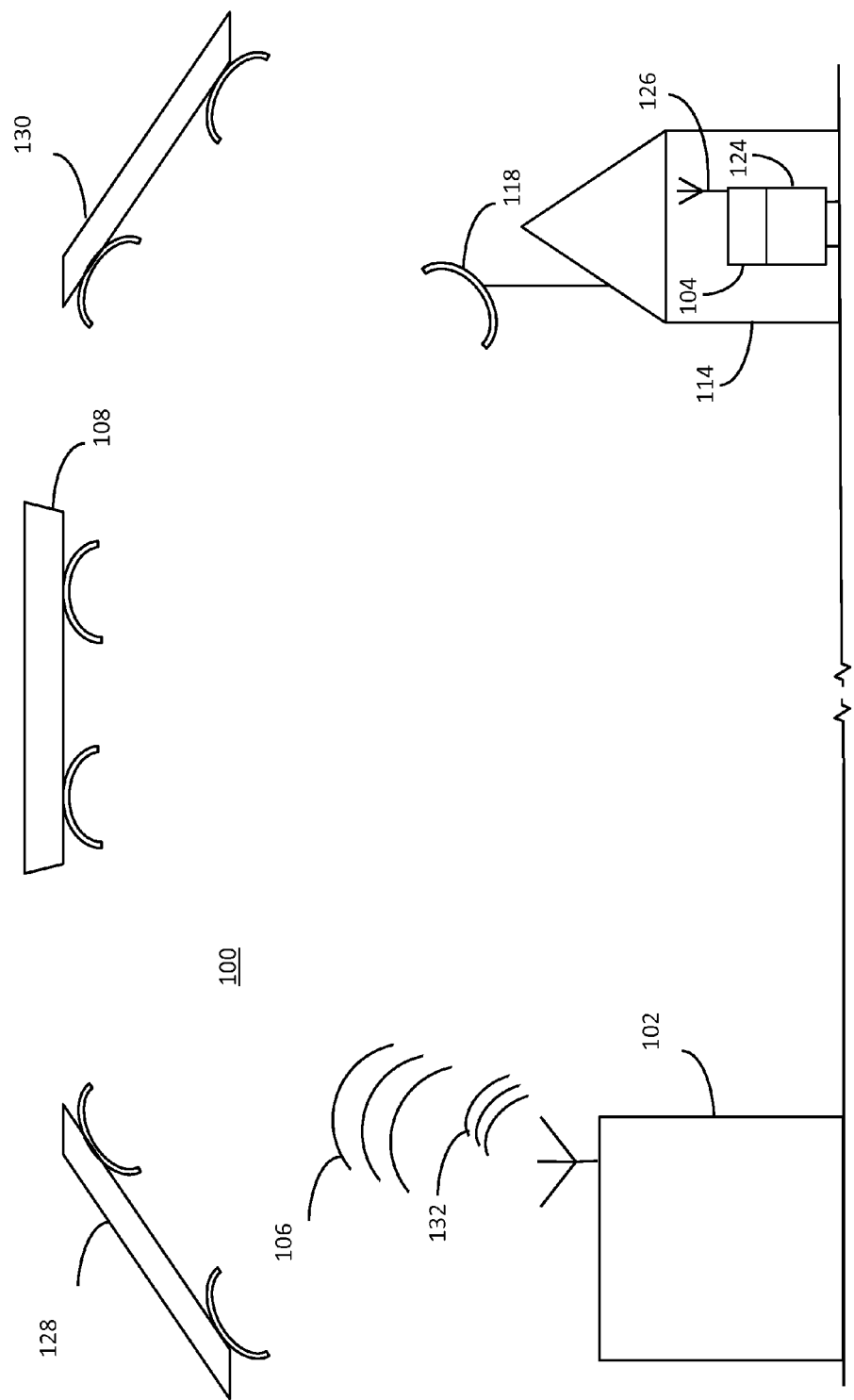
FIG. 1 shows portions of an illustrative communication network that may be used in accordance with the principles of the invention.

Apparatus and methods for indicating the identity of a device for receiving and retransmitting programming information are provided. The device, which may be a set-top box or suitable communication network receiver, may be configured to receive a broadcast signal from an antenna, which may be a satellite, a cable, an electronic communication network or any other suitable source. The programming information may be any type of audio or video data, or any other suitable type of data.

The device may also be configured to decompress, decode and output the programming information in a suitable format. For example, the device may output the programming information to a television, a personal video recorder or an electronic communication network. The apparatus and methods may encode the identity of the device into the output. A broadcasting station that transmits to the programming information to the device may prearrange the programming information in such a way that the apparatus and methods may encode the output without requiring unrestricted access to decrypted programming information.

The device identity may be represented by a serial number, a signature based on the serial number, or any other suitable identification information.

A data stream will be discussed below in the context of satellite television broadcasting for the purpose of illustration. For example, a data stream may be a packetized elementary stream that corresponds to a portion of a television show. Packetized elementary streams are discussed in International Standard No. 13818, which is available from the ISO/IEC (International Standards Organization and International Electrotechnical Commission, both located in Geneva, Switzerland), and is hereby incorporated by reference herein in its entirety.

The programming information may be prearranged by a broadcaster by duplicating a data stream that includes the programming information. One version of the data stream may have frames that are encoded with a first watermark. Another version of the data stream may have frames that are encoded with another watermark. Frames of additional versions may be encoded with corresponding watermarks. The versions are assigned packet identifiers ("PID"s) and are multiplexed into a data transfer stream, which may be a data transport stream. The data transport stream is then broadcast to the device and, perhaps, other receivers. Such a data transport stream may be structured in accordance with aforementioned International Standard No. 13818, which sets forth standards for MPEG-2 TS communications.

Supporting information also may be broadcast to the device. The supporting information may include, for example, splicing information, watermark encoding information (indicating which watermark (such as a "1" or a "0") is associated with each watermarked PID, and the location of content frames within the data stream. The supporting information may include any of the parameters, or information based on the parameters that may be part of an MPEG-2 TS adaptation field (defined by International Standard No. 13818, section 2.4.3.4, e.g.) and may be used to instruct the set-top box how to switch back and forth between packets associated with different PIDs to properly demultiplex the transport stream and thus deliver the programming information to a display device, such as a television.

The device may use the supporting information to splice between the one or more versions of the programming information to generate an output data stream that includes a signature that is made up of the different signatures that are present, respectively, in the different versions. The device may use one, two or more different versions to compose a signature. The signature may be based on the device's identity.

The frequency with which a signature may be encoded into an output data stream may be selected based upon factors such as content value, available bandwidth, and time. In some embodiments of the invention, the signature in the output data stream may be preceded and/or followed by a training sequence that may be used to signify the start and/or end of the device unique identifier (e.g., a set-top box serial number). Some embodiments of the invention may be compatible with numerous varieties of set-top boxes that support MPEG-2 TS splicing, including those that support MPEG-2 TS splicing based on a set-top software upgrade. Those embodiments may be backward-compatible with numerous combinations of set-top boxes and head-ends. Those embodiments may also be compatible with numerous forms of video compression and security.

Any suitable watermark detector may be used to determine the identity of a device that created a rebroadcast or reproduction. An owner or controller of the programming information may thereby identify the device as the source of a rebroadcast or reproduction of the programming information and take suitable steps to prevent further rebroadcast or reproduction or to seek compensation for past rebroadcast or reproduction.

Countermeasures to circumvent detection of unauthorized activities involving the device may be overcome by modifying the unique identifier of device. For example, instead of encoding the device serial number into an output data stream, an encrypted version of the device serial number may be encoded into the output data stream. Any suitable encryption scheme may be used. The encryption scheme may be changed as appropriate to prevent detection of the data transport stream encoding.

In some embodiments of the invention, the device may receive or compute geographic location information. The geographic information may include a zip code, geodetic coordinates, range and township designations or any other suitable geographic information. The device may encode the geographic information into the output data stream.

By encoding the unique identifier, the geographic information, or both, into the output data stream, the device can be identified in connection with any retransmission or reproduction of the programming information. Such identification may deter individuals from engaging in unauthorized retransmission and reproduction, because a content owner may be able to identify an individual based on the watermark.

As will be appreciated by one of skill in the art upon reading the following disclosure, various aspects described herein may be embodied as a method, a data processing system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

In addition, various signals representing data or events as described herein may be transferred between a source and a destination in the form of electromagnetic waves traveling through signal-conducting media such as metal wires, optical fibers, and/or wireless transmission media (e.g., air and/or space).

FIGS. 1-13 show illustrative features of the invention. It is to be understood that other embodiments may be utilized and structural and functional modifications may be made without departing from the scope and spirit of the present invention.

FIG. 1 shows illustrative system 100, in which a data transport stream, which may include one or more data packet streams, may be transmitted by head-end or broadcast station 102 to device 104. Broadcast station 102, which may be a satellite television signal broadcast station, may broadcast signal 106 to satellite station 108, which may rebroadcast the signal to site 114, at which device 104 may receive signal 106 via antenna 118, which may have a suitable feedhorn (not shown). It will be appreciated that in a communication network such as 100, the propagation of signals along a series of nodes may require suitable modification of a signal, but for the sake of clarity, such modifications are ignored in FIG. 1 and the same reference numeral is used to identify such a signal at more than one stage of propagation.

Antenna 118 may transmit signal 106 to device 104. Device 104 may process signal 106 and, following processing, may output a signal based on signal 106 to output device 124, which may be any suitable output device, such as a visual or audio output device, such as a display screen or speaker. Users of output device 124 receive the benefit of signal 106 when they view or hear output from output device 124.

The geographic location of site 114 may be detected by identifying the location of device 104 using a location-detecting module in, or in communication with, device 104. The location-detecting module may communicate, via antenna 126, for example, with one or more beacons such as one or more of satellites 128 and 130, which are representative of other beacons that may be accessible and may be used to calculate the actual position of device 104 using known methods, such as those used by devices that utilize the Global Positioning System.

In some embodiments, device 104 may transmit to broadcast station 102, via antenna 118, the geographic location of device 104. If appropriate, broadcast station 102 may transmit disable signal 132 that may instruct device 104 to disable a function of device 104 and thereby prevent a user at site 114 from receiving the benefit at output device 124 from signal 106. The disable signal may be sent, for example, based on unauthorized reproduction or retransmission of signal 106 by a user of device 104 or for any other suitable reason.

Figure 2:
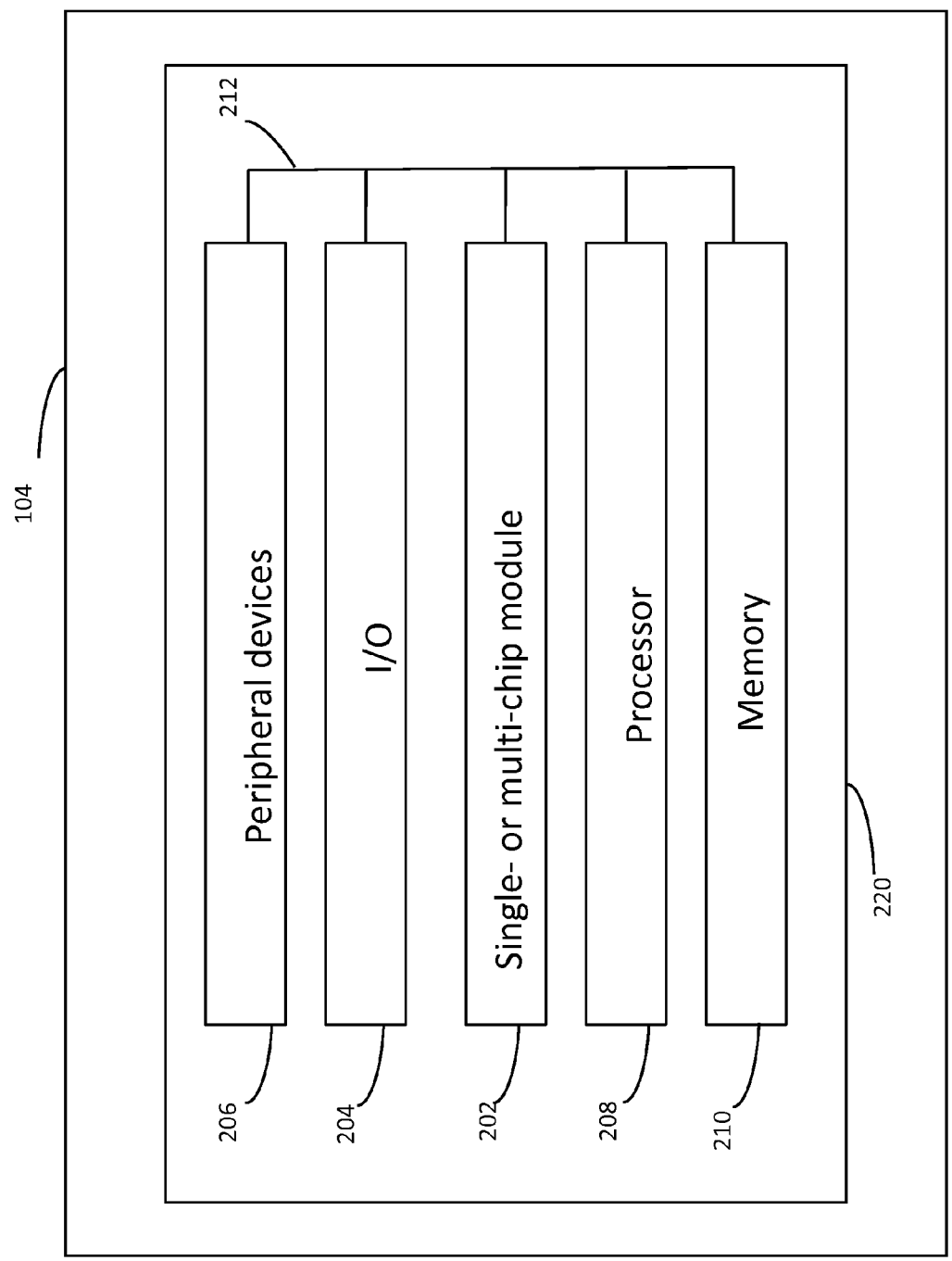
FIG. 2 shows portions of an illustrative device that may be used in accordance with the principles of the invention.

FIG. 2 shows an illustrative embodiment of device 104 (shown in FIG. 1). Device 104 may include single or multichip module 202, which can be one or more integrated circuits, and which may include logic configured to: demultiplex data packet streams that have been multiplexed into a data transport stream using different PIDs; read a data transport stream adaptation field; splice between data packet streams that have different PIDs to generate an output data stream that has a signature based on watermarks in the data transport stream and on the device identity; control the transmission of data (such as device 104 geographic location) to head end 102 (shown in FIG. 1); or perform any other suitable logical operations. Device 104 may include one or more of the following components: I/O circuitry 204, which may interface with coaxial cable, telephone lines, wireless devices, such as antenna 126 (shown in FIG. 1), output device 124 (shown in FIG. 1), a keypad/display control device or any other suitable media or devices; peripheral devices 206, which may include counter timers, real-time timers, power-on reset generators or any other suitable peripheral devices; processor 208, which may control process flow, and which may enable and disable functionality of other components in device 104; and memory 210, which may store any suitable information, such as device 104 serial number. Components 202, 204, 206, 208 and 210 may be coupled together by a system bus or other interconnections 212 and may be present on one or more circuit boards such as 220. In some embodiments, the components may be integrated into a single chip.

Figure 3:
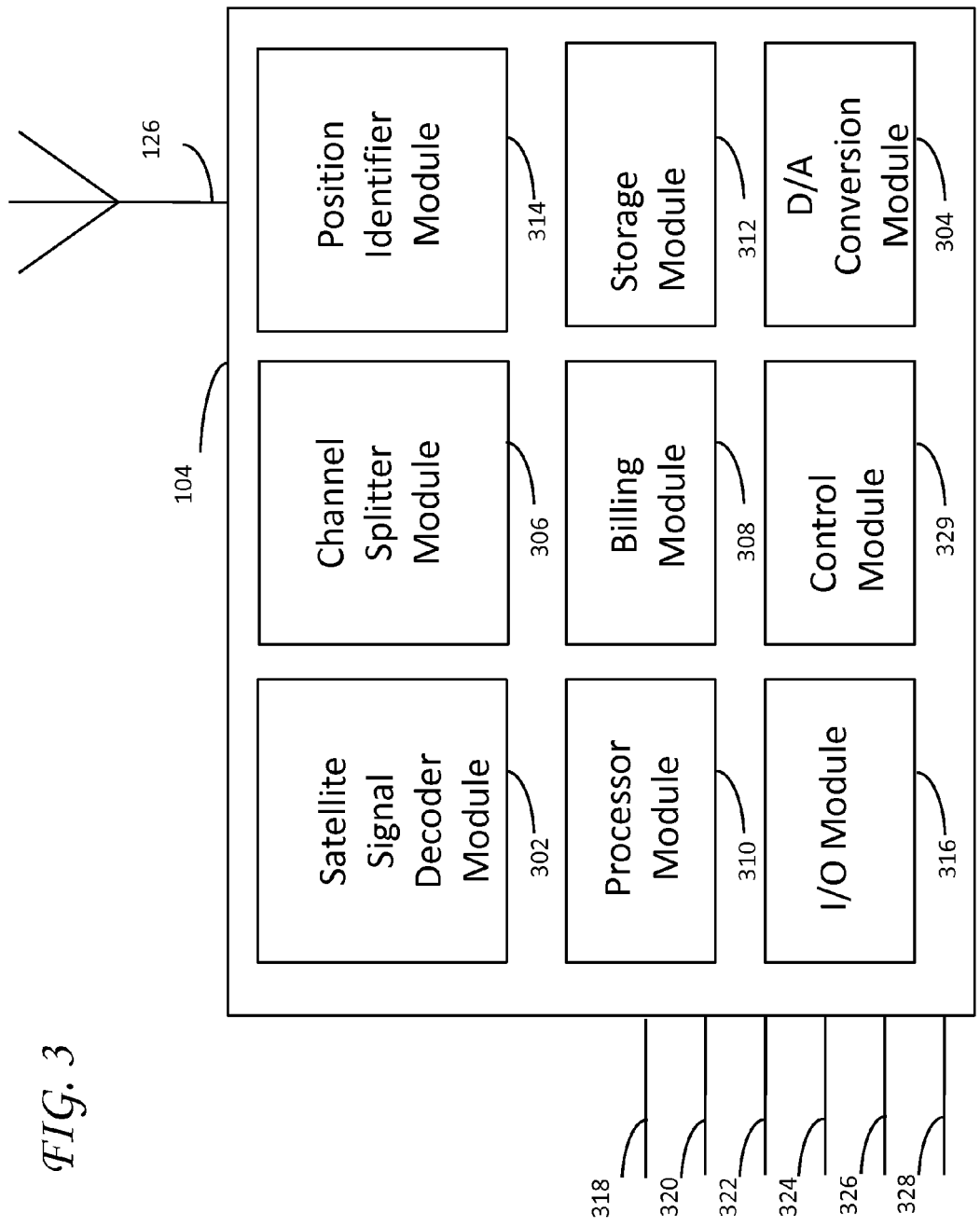
FIG. 3 shows another illustrative device that may be used in accordance with the principles of the invention.

FIG. 3 shows illustrative function-based modules that may be present in device 104 in connection with the hardware components shown in FIG. 2. Device 104 may include satellite signal decoder module 302, which may unscramble signal 106. Signal 106 may be encrypted using DES (Data Encryption Standard), 3DES (Triple Data Encryption Standard), AES (Advanced Encryption Standard) or any other suitable method of encryption used by set-top box conditional access systems. Module 302 may output digital motion picture data in any suitable compression format, such as MPEG-2, MPEG-4, AVC (Advanced Video Coding), VC1 (a Society of Motion Picture and Television Engineers codec standard) or any other suitable video compression format, to D/A (digital-to-analog) conversion module 304, which may convert the digital motion picture data into an analog data stream that is appropriate for output device 124 (shown in FIG. 1). The analog data stream may conform to the National Television Systems Committee ("NTSC") format, PAL (Phase Alternating Line), or any other suitable uncompressed video format. Device 104 may include channel splitter module 306, which may split out a user-selected channel of information from signal 106 for analog conversion by conversion module 304. Channel splitter module 306 may demultiplex data packet streams, such as those corresponding to a packetized elementary stream that has been multiplexed into two different PIDs. Device 104 may include billing module 308, which may record billing entries associated with pay-per-view broadcast events. Processor module 310 and storage module 312 may correspond to processor 208 and memory 210 (shown in FIG. 2).

Device 104 may include position identifier module 314, which may be in communication with antenna 126 (shown also in FIG. 1), for receiving positioning data from satellites such as 128 and 130 (shown in FIG. 1). In some embodiments, antenna 126 may be in direct communication with input-output ("I/O") module 316. The positioning data may define the actual location of device 104. Processor module may deny to a user of device 104 the benefit of information from signal 106 by disabling one or more of the functional modules in device 104 if, for example, an operator or controller of broadcast station 102 desires to prevent unauthorized rebroadcast or retransmission of signals from device 104. In some embodiments, the benefit may be denied by disabling data communication between one or more of the modules in device 104.

I/O module 316 may be in communication with port 318, which may receive signal 106 from antenna 118 (shown in FIG. 1). I/O module 316 may be in communication with port 320, which may exchange data with a keypad/display device (not shown), which may be used to configure device 104. The keypad/display device may be used to input a location that is eligible for service. I/O module 316 may be in communication with cable port 322, which may exchange content or control data over a coaxial cable-based communication network. The cable-based network may be a cable television network, a MoCA™-based network, or any other suitable electronic communications network. (MOCA is the Multimedia over Coax Alliance, which provides at its website (www.mocalliance.org) an example of a specification (viz., that available under the trademark MoCA, which is hereby incorporated herein by reference in its entirety) for networking of digital video and entertainment information through coaxial cable.)

I/O module 316 may be in communication with port 324, which may exchange content or control data over an Ethernet-based communication network or any other suitable communication network. I/O module 316 may exchange content or control data with a wireless transceiver (not shown) via port 326. The wireless transceiver may operate using Bluetooth, IR, or any other suitable protocols. The content may be any form of audio, video or text content. The control data may include program guide information, program selections, control data for controlling the functionality, or for disabling, device 104, or any other suitable data. I/O module 316 may be in communication with port 328 to output information to output device 124, thereby delivering a benefit of signal 106 to a user of device 104.

Control module 329 may be present to interface between I/O module 316 and other modules present in device 104.

Device 104 may operate in a networked environment supporting connections to one or more remote computers (not shown). The network connections may include a local area network (not shown) and a wide area network (not shown), but may also include other networks. It will be appreciated that the network connections shown are illustrative and other means of establishing a communications link between the computers may be used. The existence of any of various well-known protocols such as TCP/IP, Ethernet, FTP, HTTP and the like is presumed, and device 104 can be operated as a server in a client-server configuration to permit a user to retrieve web pages from device 104. Any of various conventional web browsers can be used to display and manipulate data on web pages.

Device 104 may support the implementation of computer executable instructions for invoking user functionality related to communication, such as email, short message service ("SMS"), and voice input and speech recognition applications.

Figure 4:
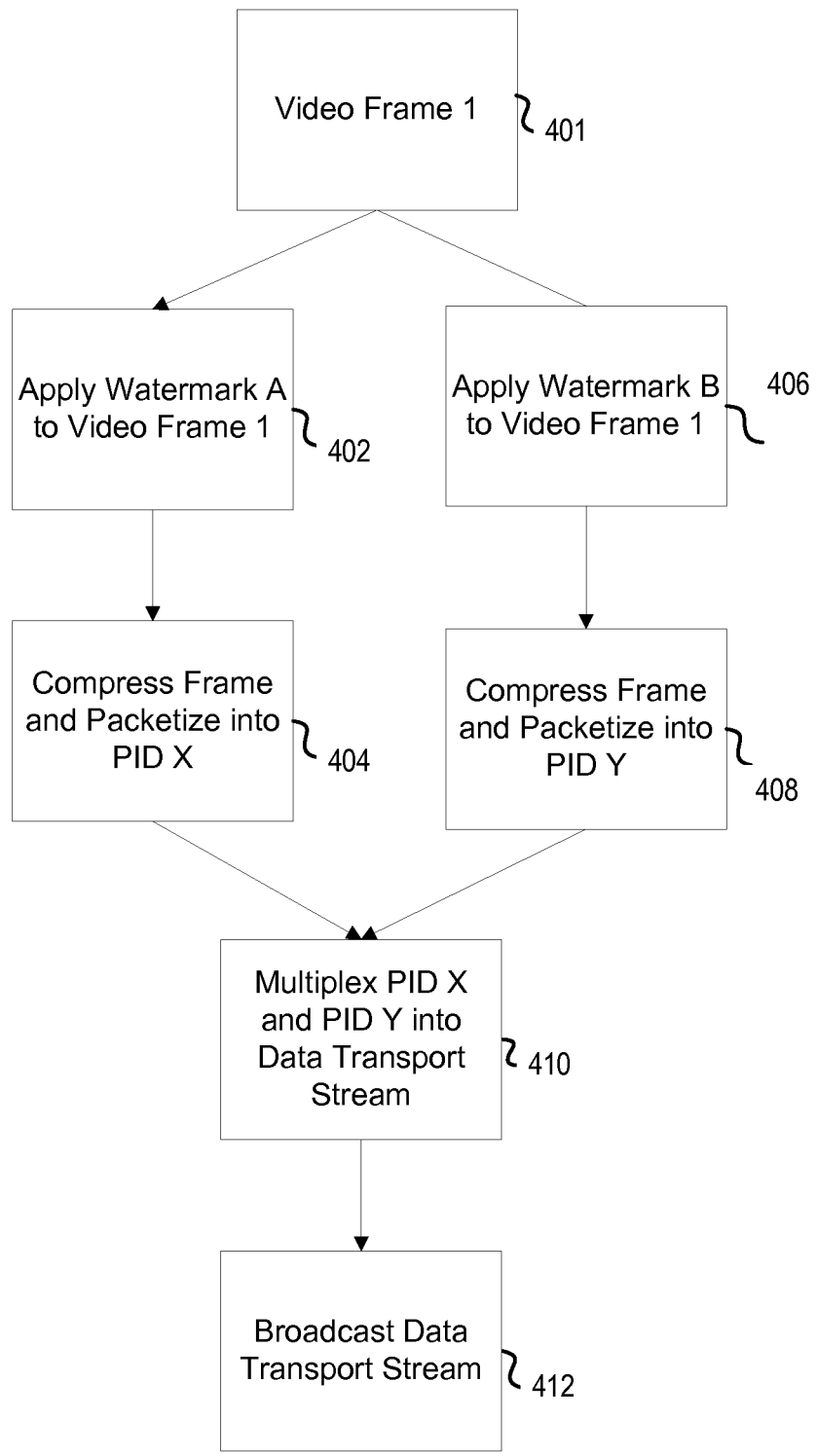
FIG. 4 shows an illustrative method in accordance with the principles of the invention.

FIG. 4 shows an illustrative flow diagram of a method according to the invention. The method shown in FIG. 4 is preferably shown from the perspective of the original head-end.

Step 401 illustrates a video frame. Step 402 shows applying a first watermark, watermark A, to the video frame of step 401. Step 404 shows compressing the frame and packetizing the frame in a first PID, PID X, for transmission. Step 406 shows applying a second watermark, watermark B, to the video frame of step 401. Step 408 shows compressing the frame and packetizing the frame in a second PID, PID Y, for transmission. Preferably, version 1 and version 2 include identical programming information and/or other non-watermark data.

Step 410 shows multiplexing version 1 and version 2 into a data transport stream. Thereafter, the data transport stream may be broadcast, as shown in step 412.

Figure 5:
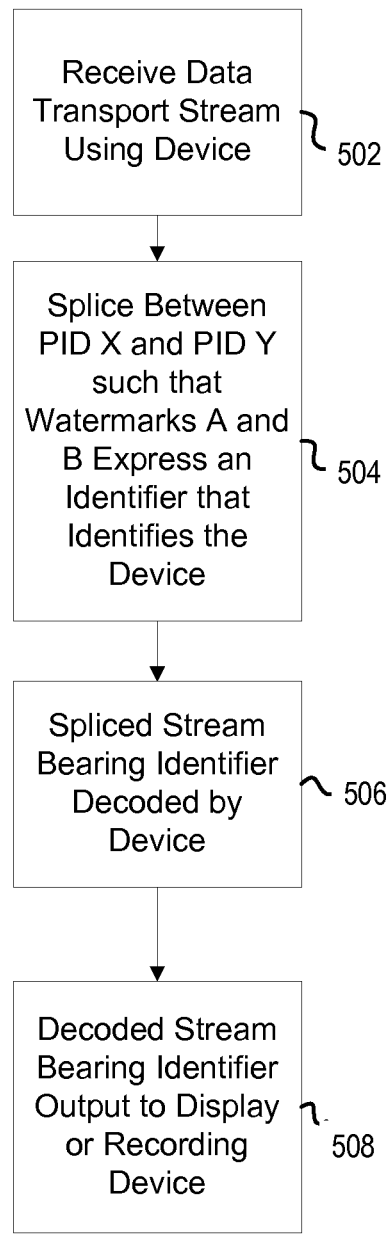
FIG. 5 shows another illustrative method in accordance with the principles of the invention.

FIG. 5 shows an illustrative flow diagram of another method according to the invention. The method shown in FIG. 5 may be understood to be from the perspective of a device receiving a transport data stream from the head-end or other suitable broadcasting device.

Step 502 shows receiving the data transport stream, preferably from the head-end or other suitable data transport stream provider. Step 504 shows splicing between PID X and PID Y such that watermarks A and B express an identifier that identifies the receiving device. Step 506 shows decoding the spliced stream bearing the identifier using the device. Step 508 shows outputting the decoded stream of step 506 to a display device or to a recording device.

Figure 6:
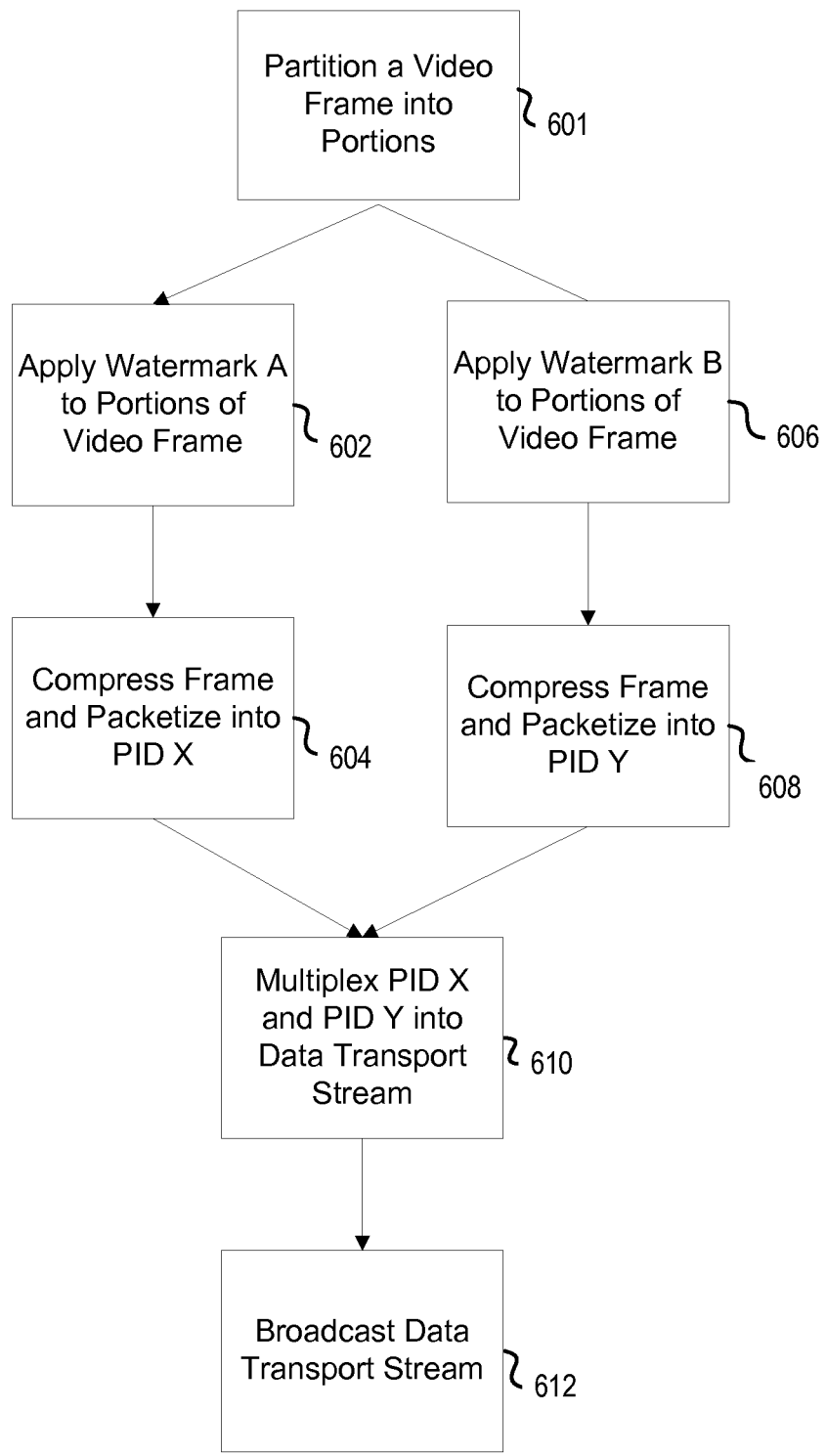
FIG. 6 shows yet an illustrative method in accordance with the principles of the invention.

FIG. 6 shows an illustrative flow diagram of another method according to the invention preferably from the perspective of the head-end or other suitable broadcasting device. Step 601 shows partitioning a video frame into portions. Step 602 shows applying watermark A to portions of the video frame of step 601. Step 604 shows compressing the video frame and packetizing the frame into PID X. Step 606 shows applying watermark B to portions of the video frame of step 601. Step 608 shows compressing the video frame and packetizing the frame into PID Y.

Step 610 shows applying watermark B to all or some version 2 portions. Step 612 shows designating PID Y for version 2.

Step 610 shows multiplexing version 1 and version 2 streams into a data transport stream. The data transport stream is broadcast in step 612.

Figure 7:
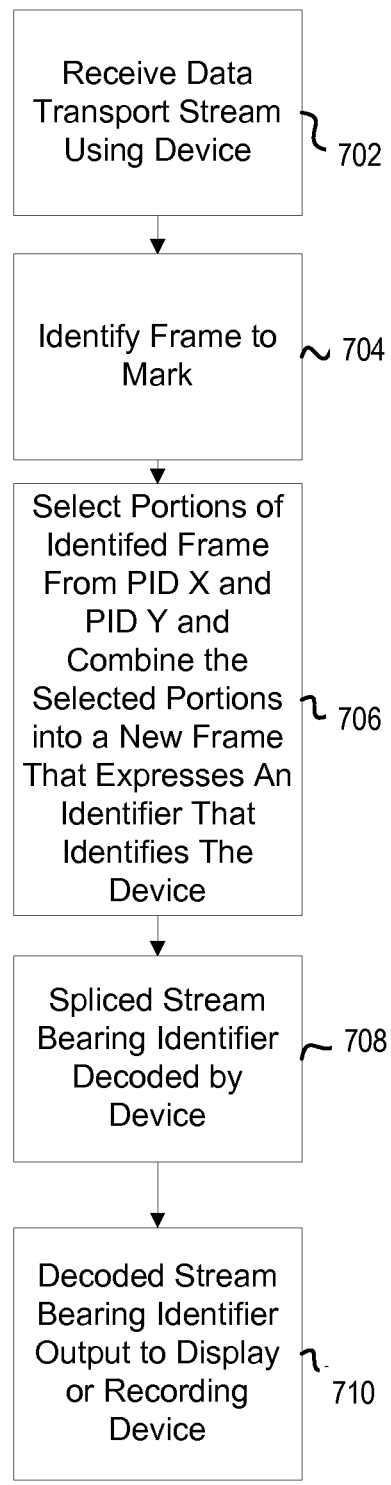
FIG. 7 shows still another illustrative method in accordance with the principles of the invention.

FIG. 7 shows another illustrative flow diagram of a method according to the invention. The method shown in FIG. 7 may also be understood to be from the perspective of a device receiving a transport data stream from the head-end or other suitable broadcasting device.

Step 702 shows receiving the data transport stream using a device. Step 704 shows identifying a frame that is for marking. Step 706 shows selecting portions of the identified frame from PID X and PID Y and combining the selected portions into a new frame that expresses an identifier that identifies the receiving device. Step 708 shows decoding the spliced stream bearing the identifier using the device. Step 710 shows outputting the decoded stream of step 708 to a display device or to a recording device. The new packetized elementary stream preferably bears the identifier. The new packetized elementary stream is preferably output to a display device or to a recording device.

Figure 8:
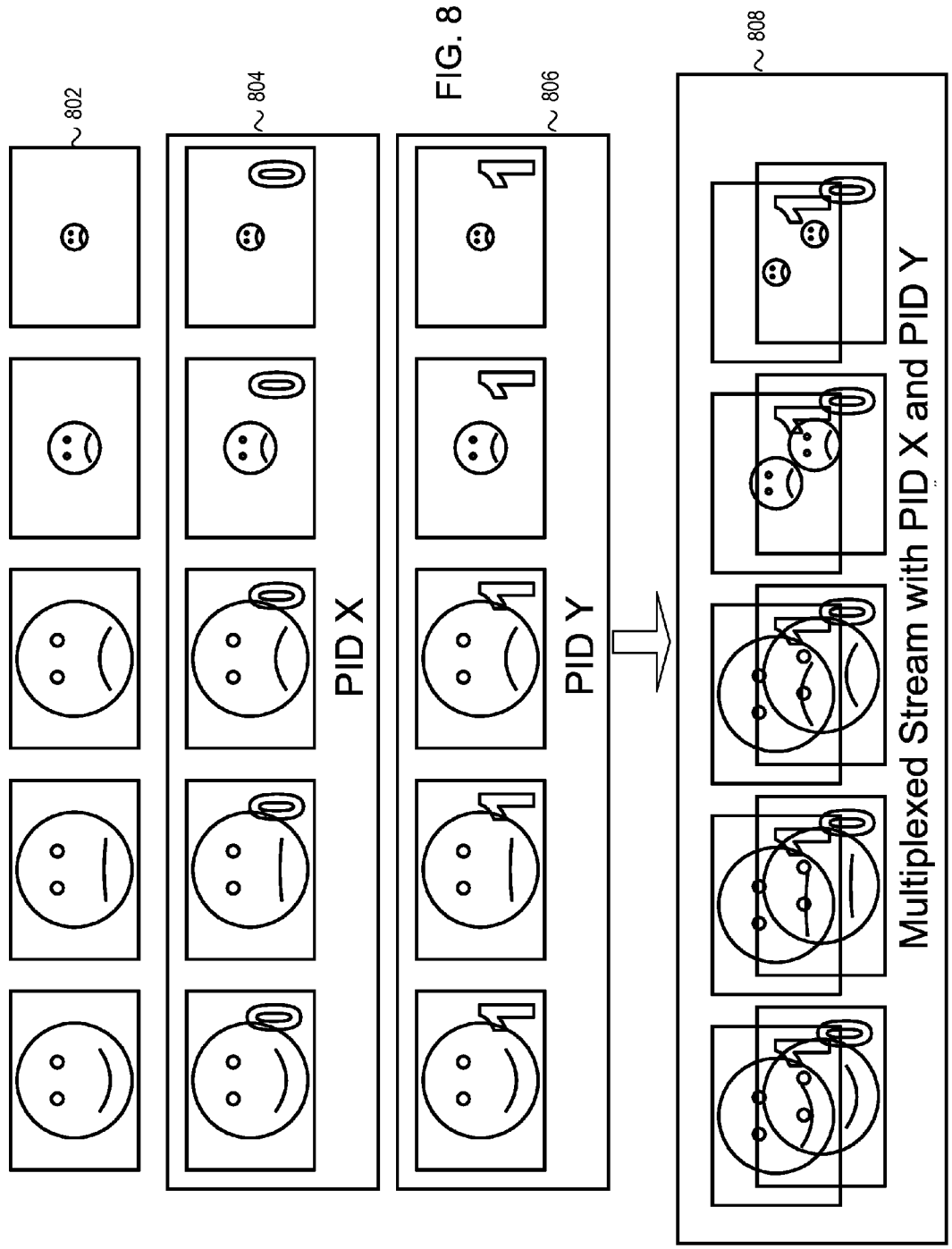
FIG. 8 shows an illustrative application of the method shown in FIG. 4.

FIG. 8 shows a schematic diagram that illustrates the invention. Frames 802 indicate the original frames of the transmission. Frames 804 and 806 represent multiple versions of the transmission in frame 802. In this embodiment of the invention, the head-end may encode multiple versions of some (or all) of the frames. Each version preferably includes a watermark that is different from the watermark in the other version. The head-end preferably multiplexes PIDS (including splicing information that indicates where the PIDS may be spliced) into a multiplexed stream 808. The multiplexed stream is preferably then broadcast to client set top boxes.

Figure 9:
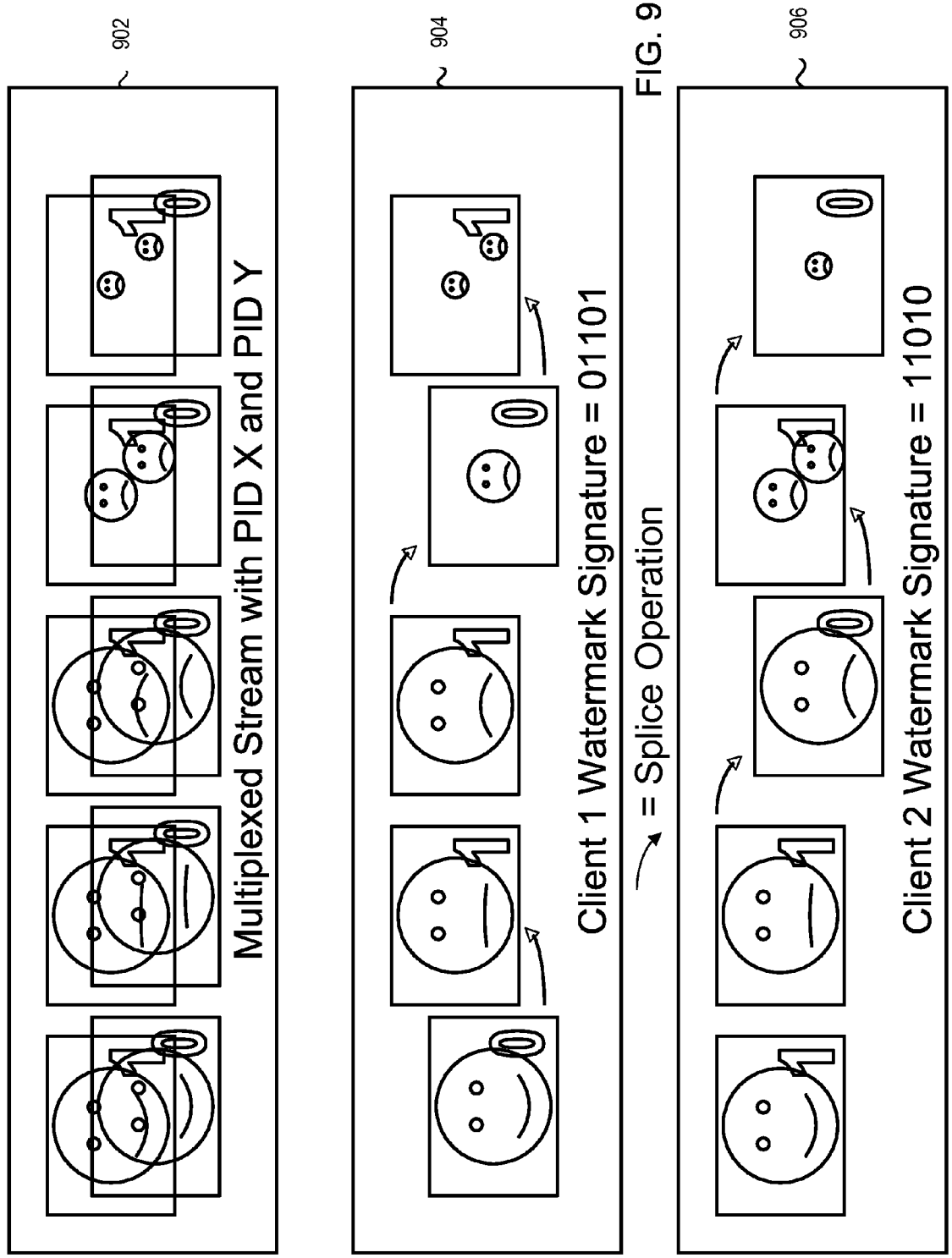
FIG. 9 shows an illustrative application of the method shown in FIG. 5.

FIG. 9 is another schematic diagram that illustrates a second portion of the method according to the invention. A multiplexed stream 902 is preferably sent to client set top boxes. Each client preferably uses a splice operation to create a unique watermark signature by splicing between frames of the transmission. This is shown in boxes 904 and 906. This splicing preferably occurs during the decoding of the transmission but may occur at any suitable time.

Figure 10:
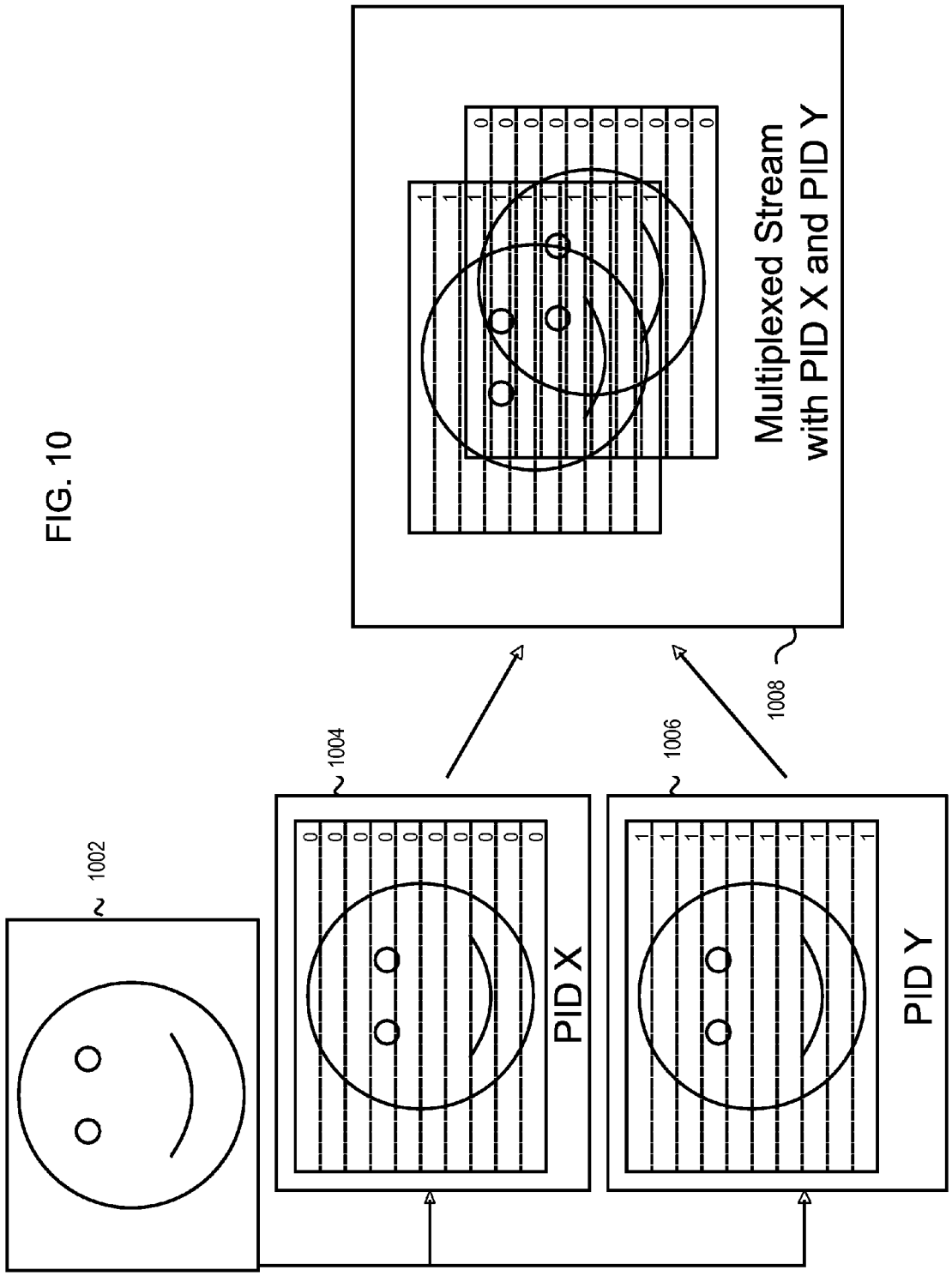
FIG. 10 shows an illustrative application of the method shown in FIG. 6.

FIG. 10 shows another method according to the invention of applying a watermark to the transmission.

The head-end preferably creates multiple versions 1004 (for transmission as PID X) and 1006 (for transmission as PID Y) of video frame 1002. The video frames in each PID are preferably broken into multiple portions. Each portion is encoded with a watermarked value—e.g., 1 or 0. These sections and frames are then multiplexed into a transport stream with splicing information for each portion of the frame, as shown in box 1008.

FIG. 11 may be considered a continuation of the method shown in FIG. 10. Multiplexed stream 1102 is then used by each client to create a unique watermark signature, as shown in box 1108, by splicing between portions of versions 1104 and 1106 of the video frame during the decode operation.

Figure 12:
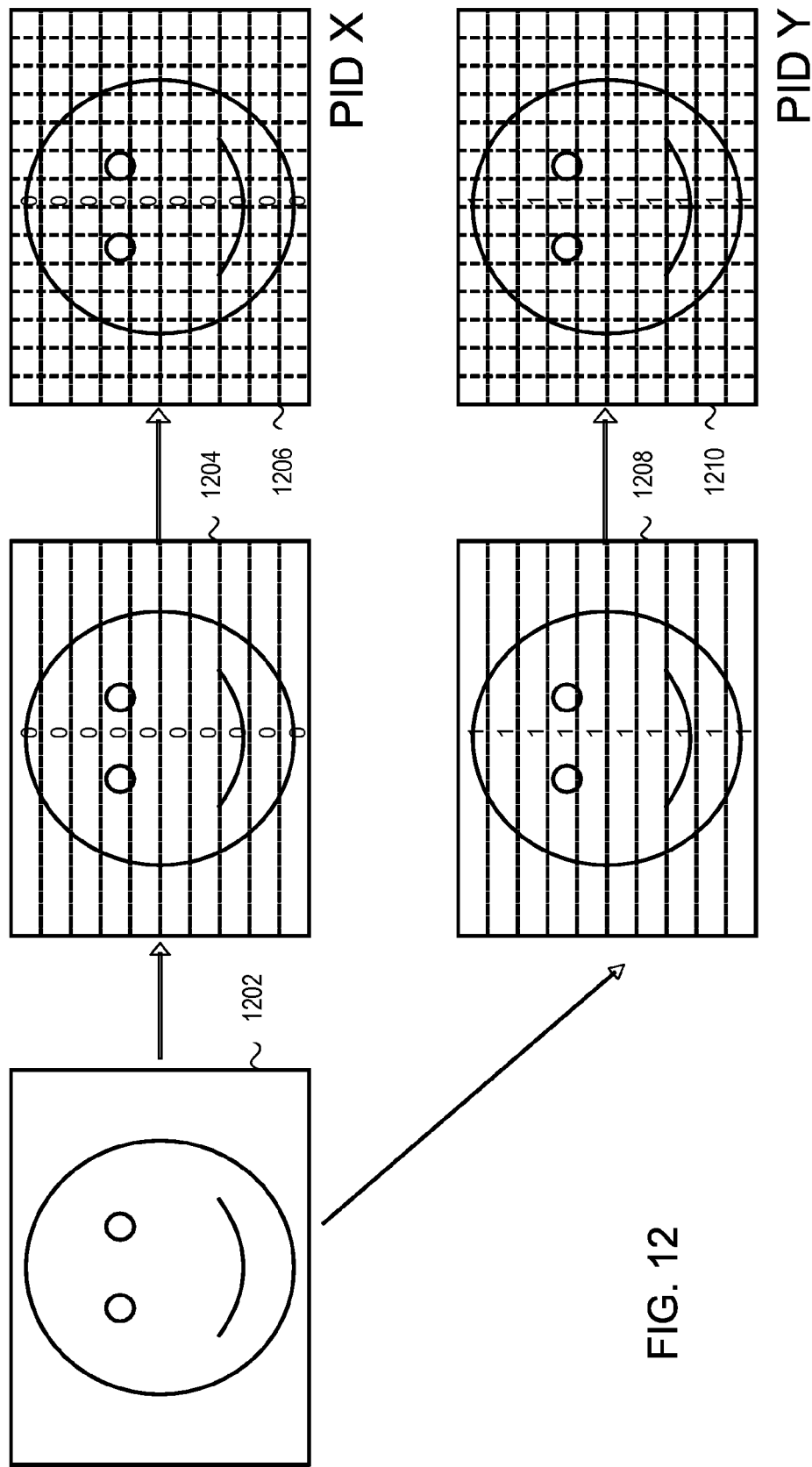
FIG. 12 shows another aspect of the illustrative application of the method shown in FIG. 6.

FIG. 12 shows yet another method according to the invention. Box 1202 indicates an original frame. Frame 1202 is split into two watermarked frames 1204 and 1208. The watermarks for frames 1204 and 1208 are preferably different. Boxes 1206 and 1210 represent frames 1204 and 1208, respectively, after the information therein has been compressed and packetized.

FIG. 13 shows a schematic diagram of results obtained using the method shown in FIG. 12. Frame 1302 shows a first frame of a transmission according to the method shown in FIG. 12. Frame 1302 includes a first watermark that originates with a 1 and continues with a list of all 0s. Frame 1304 shows a second frame that includes a second watermark. The second watermark preferably originates with a 0 and continues with a list of 1s.

Thus, apparatus and methods for indicating the identity of a device for receiving and retransmitting programming information have been provided.

Aspects of the invention have been described in terms of illustrative embodiments thereof. A person having ordinary skill in the art will appreciate that numerous additional embodiments, modifications, and variations may exist that remain within the scope and spirit of the appended claims. For example, one of ordinary skill in the art will appreciate that the steps illustrated in the figures may be performed in other than the recited order and that one or more steps illustrated may be optional. The methods and systems of the above-referenced embodiments may also include other additional elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

What is claimed is:

1. A method for identifying a communication network receiver, the method comprising:

receiving at the communication network receiver, over a network, a transport stream, the transport stream comprising a first data stream and a second data stream, the first data stream including a sequence of frames having a first watermark, and the second data stream including the sequence of frames having a second watermark;

identifying a location of the communication network receiver;

generating an identifier for the communication network receiver by outputting, to a display or a recorder, a modified sequence of frames selected from the first data stream and the second data stream that is based on:
the first watermark;
the second watermark;
and the location; and
wherein generating the identifier comprises, before the outputting, generating the modified sequence of frames by selecting frames from the transport stream by splicing between a first packet identifier ("PID") and a second PID, the first and second PIDs corresponding to the first and second data streams, respectively.

2. The method of claim 1 wherein the first data stream is a packetized elementary stream.

3. The method of claim 1 wherein the programming includes satellite television programming.

4. The method of claim 1 wherein the programming includes cable television programming.

5. The method of claim 1 wherein the programming includes programming conveyed by the Internet.

6. The method of claim 1 wherein the programming includes radio programming.

7. The method of claim 1 wherein the transport stream is a data transport stream.

8. The method of claim 1 wherein the modified sequence of frames uniquely identifies the communication network receiver.

9. The method of claim 1 wherein the modified sequence of frames is a binary pattern.

10. The method of claim 9 wherein the binary pattern corresponds to a binary representation of a serial number corresponding to the communication network receiver.

11. The method of claim 1 wherein the receiving and the outputting are performed by the communication network receiver.

12. A method for identifying a communication network receiver for receiving and outputting programming information, the method comprising:
receiving a first data stream, from a broadcasting station, at the communication network receiver, the first data stream including the programming information, the first data stream including a first frame having a first watermark;
identifying a location of the communication network receiver;
receiving a second data stream, from the broadcasting station, at the communication network receiver, the second data stream including the programming information, the second data stream including the first frame having a second watermark; and
transmitting to a display or a recorder a second frame that includes the first watermark, the second watermark and the location;
wherein the first and second frames correspond to the same programming information and before the transmitting to a display device or a recorder, selecting for inclusion in the second frame, portions of the first frame having the first watermark and the second frame having a second water mark by splicing between a first packet identifier ("PID") and a second PID, the first and second PIDs corresponding to the first and second watermarks, respectively.

13. The method of claim 12 wherein the transmitting includes generating in the second frame a pattern at a receiver module based on the first and second watermarks, the pattern identifying the communication network receiver.

14. The method of claim 13 wherein the pattern uniquely identifies the communication network receiver.

15. The method of claim 13 wherein the pattern corresponds to a binary number.

16. The method of claim 13 wherein the pattern corresponds to a binary representation of a serial number corresponding to the communication network receiver.

17. The method of claim 12 wherein the programming information includes cable television programming.

18. The method of claim 12 wherein the first data stream is a packetized elementary stream.

19. The method of claim 12 further comprising demultiplexing the first data stream and the second data stream from a data transport stream.

20. The method of claim 12, wherein the communication network receiver is a set top box.

21. A method for encoding a signature in a new data frame, the method comprising:
receiving a first data stream and a second data stream at a network communication receiver, the first data stream and the second data stream each comprising a contiguous sequence of programming information;
splicing between the first data stream and the second data stream to select a first watermark corresponding to the first data stream and a second watermark corresponding to the second data stream;
identifying a geographic location of the network communication receiver
generating the new data frame including the first watermark, the second watermark and the geographic location in the new data frame to form the signature; and
combining a first portion from a first frame of the first data stream and a second portion of a second data from of the second data stream to generate the new data frame, wherein the first portion is selected from the first frame based on a first packet identifier associated with the first data stream and the second portion is selected from the second frame based on a second packet identifier associated with the second data stream.

22. The method of claim 21 wherein the including comprises:
designating for a first portion of the new frame: (a) the first watermark, and (b) the contiguous sequence of programming information that, in the first data stream, is adjacent the first watermark; and
designating for a second portion of the frame: (a) the second watermark, and (b) the contiguous sequence of programming information that, in the second data stream, is adjacent the second watermark.

23. The method of claim 21 wherein the splicing comprises identifying the first and second data streams using a first packet identifier ("PID)") corresponding to the first data stream and a second PID corresponding to the second data stream, the first and second data streams being part of a data transport stream that conforms to an MPEG-2 TS standard.

24. The method of claim 21, wherein the signature of the new data frame is formed at the network communication receiver.

25. An apparatus for applying a signature to an output signal of a communication network receiver, the apparatus comprising:
the communication network receiver configured to receive, from a broadcasting station, a first data stream and a second data stream, the first data stream and the second data stream having a duplicate sequence of programming information, the first data stream including frames having a first watermark, and the second data stream including frames having a second watermark; and an output module configured to output the output signal, the output module being operable to generate a sequence of frames by splicing between a first packet identifier ("PID") and a second PID, the first and second PIDs corresponding to the first and second data streams, respectively, the output signal including the sequence of frames selected from the first data stream and the second data stream, the sequence of frames including a signature sequence that is based on:

the first watermark;

the second watermark; and a location of the communication network receiver;

wherein the signature sequence identifies the communication network receiver and the location of the communication network receiver.

26. The apparatus of claim 25 further comprising a logic module configured to splice between the first and second data streams such that the signature sequence corresponds to information that identifies the apparatus.

27. The apparatus of claim 26 wherein the receiver module is configured to receive an MPEG-2 TS data transport stream from the broadcast station, wherein the broadcast station is a satellite television broadcast station.

* * * * *